United States Patent
Möller et al.

(10) Patent No.: US 8,007,944 B2
(45) Date of Patent: Aug. 30, 2011

(54) ACTIVE TEST FUEL CELL FOR CHARACTERIZING AND QUALIFYING CELL-INTERNAL FUEL CELL COMPONENTS

(75) Inventors: Stephan Möller, Wismar (DE); Christian Härte, Plau am See (DE); Bastian Ruffmann, Schwerin (DE)

(73) Assignee: Balticfuelcells GmbH, Schwerin (DE)

( * ) Notice: Subject to any disclaimer, the term of this patent is extended or adjusted under 35 U.S.C. 154(b) by 1085 days.

(21) Appl. No.: 11/802,940

(22) Filed: May 29, 2007

(65) Prior Publication Data
US 2007/0275287 A1 Nov. 29, 2007

Related U.S. Application Data

(63) Continuation-in-part of application No. PCT/DE2005/002149, filed on Nov. 29, 2005.

(30) Foreign Application Priority Data

Nov. 29, 2004 (DE) .................... 20 2004 018 521 U

(51) Int. Cl.
*H01M 8/24* (2006.01)
*H01M 8/10* (2006.01)

(52) U.S. Cl. ........................................ 429/400; 429/483
(58) Field of Classification Search .................. None
See application file for complete search history.

(56) References Cited

U.S. PATENT DOCUMENTS

| 5,858,569 | A | 1/1999 | Meacher et al. | |
|---|---|---|---|---|
| 2007/0172712 | A1* | 7/2007 | Hsiao et al. | 429/25 |
| 2008/0150540 | A1* | 6/2008 | Okuda | 324/426 |

FOREIGN PATENT DOCUMENTS

| JP | 58-053166 | 3/1983 |
|---|---|---|
| JP | 58-119170 | 7/1983 |

* cited by examiner

*Primary Examiner* — John S Maples
(74) *Attorney, Agent, or Firm* — Walter Ottesen

(57) ABSTRACT

An active test fuel cell characterizes and qualifies cell-internal components to establish technical data on the cell-internal components to be tested at low assembly costs, at a low error rate and with a high degree of reproducibility of the measuring results. The test fuel cell includes two housing plates. One of the housing plates is coupled to a piston/cylinder unit whose piston acts on a pressure element which in turn applies a load to the cell-internal components being tested.

1 Claim, 2 Drawing Sheets

US 8,007,944 B2

ACTIVE TEST FUEL CELL FOR CHARACTERIZING AND QUALIFYING CELL-INTERNAL FUEL CELL COMPONENTS

CROSS REFERENCE TO RELATED APPLICATIONS

This application is a continuation-in-part application of international patent application PCT/DE 2005/002149, filed Nov. 29, 2005, and claims priority of German utility model application no. 20 2004 018 521.0, filed Nov. 29, 2004, and the entire contents of both applications are incorporated herein by reference.

FIELD OF THE INVENTION

The invention relates to a test fuel cell for characterizing and qualifying internal fuel cell components which includes a receptacle housing for the cell-internal fuel cell components.

BACKGROUND OF THE INVENTION

A polymer electrolyte membrane fuel cell (PEMFC) converts a chemical energy carrier (hydrogen PEFC or methanol DMFC) directly into electric energy. The core components of a PEMFC are subjected to continuous further development. The polymer electrolyte as well as the electrodes with their catalytic converters are subjected to high material requirements. This notwithstanding, the PEMFC is about ready for wide market introduction.

The principal configuration of a PEMFC is, in turn, subdivided into two sectors which are described under the headings "electrochemical" and "hardware".

1. Electrochemical

Cell-internal components define the fuel cell and include the following:
(a) a polymer electrolyte membrane PEM (solid electrolyte in foil form);
(b) active electrodes including precious metal catalytic converters (three phase layer; combined with PEM, there results a membrane electrode assembly (MEA));
(c) microlayer (transition layer from electrode to gas diffusion layer);
(d) gas diffusion layers or GDL (gas distribution sometimes combined with microlayer, PEM protection); and,
(e) flow fields (gas supply or gas removal, current connector; possibly with cooling layer).

2. Hardware

End plates, media connections, clamping bolts, primarily, mechanical assemblies and components.

Test fuel cells for the characterization of cell-internal components for fuel cells are configured very simply. The cell-internal components are clamped with the aid of mechanically stiff end plates and by means of threaded bolts with the aid of flat seals. The cell-internal components (MEA, GDL with and without microlayer, flow fields) are layered one atop the other in the correct sequence with the corresponding seals (flat seals, O-rings) and are assembled with the hardware to a test fuel cell.

The applied force on the active cell surface of the MEA (the zone wherein the electrochemical reactions take place) is, in these test fuel cells, dependent upon the interaction of the particular layer thicknesses of the seals, the gas diffusion layers GDL and the MEA. Thereafter, a mechanical pressure is applied to the active cell surface via the tightening torque of the clamping bolts. On the one hand, this mechanical pressure ensures the corresponding tightness and, on the other hand, substantially minimizes the contact resistance or transfer resistance of the cell-internal assembly. The higher the cell-internal applied pressure, the lower is the corresponding cell resistance.

A direct statement as to the cell-internal applied pressure is therefore dependent upon:
(a) the selection of the GDL layer thickness;
(b) the layer thickness of the sealing configuration used; and,
(c) the friction losses of the mechanical clamping.

Disadvantages of the old concept are listed below:
(a) without a change of the seals or GDLs, the applied force on the cell-internal component can be varied only over a small range. Should the applied force (for a given cell-internal assembly) be changed over a defined range, the test cell is opened and, by using other flat seals, an adjustment of the cell-internal applied pressure is made possible. This, however, is present only mathematically or theoretically. The real value remains unknown.
(b) the swelling of the membrane (contact with product water) brings about additional pressure forces. These pressure forces are not compensated by the rigid assembly.
(c) there is no possibility of a quantitative statement as to the force applied to the cell-internal components in the test fuel cell. The applied force on the active surface of the MEA [$N/mm^2$] cannot be determined in this cell without additional complexity. This, however, is a very important factor for the reproducibility of the measuring results.
(d) a rapid exchange of the cell-internal components is only possible with a great deal of caution. The method has a high error rate and the reproducibility is not provided.
(e) the internal resistance of the cell can be determined only with an additional external apparatus.
(f) the concept is not suitable for ensuring quality.

Thus, up to now, only a selective force was used which loaded the sealing elements between the two housing plates as well as the cell-internal fuel cell components being tested. An increase of the force was not effective on the inner membrane-electrode unit because the outer sealing elements prevented this. For this reason, the test fuel cell would have to be opened and newly adjusted after each investigation and this is very costly with respect to time. Furthermore, reproducibility of results was difficult to obtain.

SUMMARY OF THE INVENTION

In view of the foregoing, it is an object of the invention to provide a test fuel cell for characterizing and qualifying cell-internal fuel cell components without the above-listed disadvantages.

The test fuel cell of the invention is for checking a cell-internal fuel cell component as to quality and suitability for subsequent use in a fuel cell. The cell-internal fuel cell component has an active cell surface and the test fuel cell includes: a housing including first and second housing plates for accommodating the cell-internal fuel cell component therebetween; the first and second housing plates conjointly defining a sealing interface for sealing the first and second plates to the outside of the housing; clamping means for clamping the first and second plates together with a clamping force so as to limit the clamping function to the sealing interface thereby improving the sealing function thereof; and, force application means for applying an adjustable force to the active surface of the cell-internal fuel cell component separate from the clamping force.

An active test fuel cell was developed for characterizing and qualifying cell-internal components which makes it possible to make technical statements as to the cell-internal components to be tested and to do this with: a greatly reduced assembly complexity; a much lower error rate; and, a high reproducibility of the measuring results.

The test fuel cell is an apparatus with which a cell-internal fuel cell component such as a membrane-electrode unit can be checked as to quality and suitability so that this fuel cell component can be used later in a proper fuel cell. This testing requires that each individual membrane-electrode unit be sequentially subjected to different loads.

With the aid of a pneumatic application of pressure, the applied pressure on the active cell surface can be adjusted independently of geometric disturbance variables. A pneumatic piston directly loads the active cell surface via the pressure element. At the same time, an assembly friendly configuration makes possible a very rapid and error free assembly of the cell-internal components. A high reproducibility of the measuring results is therefore provided. Insert flow fields (monopolar plates, inlays) made of titanium additionally make possible a variation of the gas distribution and the use of the test fuel cell for hydrogen as well as for methanol. The size of the active cell surface can be designed in dependence upon the dimensioning of the test fuel cell from 5 to 100 $cm^2$.

The sealing concept used is designed as a piston cylinder seal with O-rings on the side subjected to force. The gas-tight sealed piston has a travel path of over 2 mm. This ensures a virtually unlimited variation of the total thickness of the cell-internal configuration. For exchanging the entire cell-internal assembly, the total assembly block can be removed as one piece from the holder. In this way, a reliable exchange of cell-internal components is greatly simplified.

In addition, the test fuel cell is provided with an evaluation unit and control unit. An automatic fine gas pressure reducer provides a wanted prepressure of the cylinder during test operation. The magnitude of the pressure can not only be pregiven but also measured and subsequently graphically displayed in the evaluation unit.

The evaluation and control unit supplies the heating elements of the test fuel cell with the corresponding temperature voltage and can determine parameters for the qualification of internal fuel cell components. In summary, the evaluation and control unit fulfills the following tasks:

(a) operator-controlled field for calibration and indicator field for measurement data;

(b) arrangement for measuring impedance for determining membrane resistance, membrane conductivity and cell-internal total resistance;

(c) temperature adjustment and control;

(d) adjusting gas volume flows and control of mass-flow controllers;

(e) measurement and determination of oxygen permeation of the membrane (quality criterion); and, (f) coupling of the evaluation and control unit via a data interface to external apparatus.

This apparatus of the invention can be used in research and development as well as for the qualification in the context of quality control measures or product tests of components.

The test fuel cell according to the invention is an apparatus for characterizing cell-internal components for fuel cells. This is characterized by the adjustability of the application of pressure to the active surface of the fuel cell. (A variation of the cell-internal layer thicknesses is therefore independent of the selected configuration and has no influence on measurements.)

The apparatus according to the invention makes possible an independent determination of electrical and physical measurement quantities.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
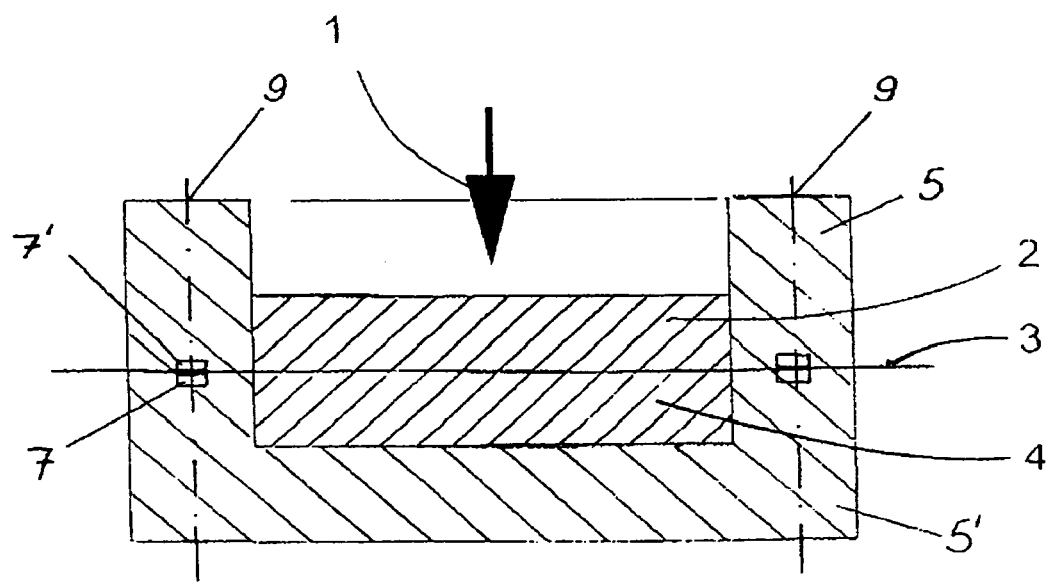
FIG. 1 is a side elevation view, in section, of a test fuel cell according to the invention; and, FIG. 2 is a perspective exploded view showing the elements of the test fuel cell of FIG. 1.
Figure 2:
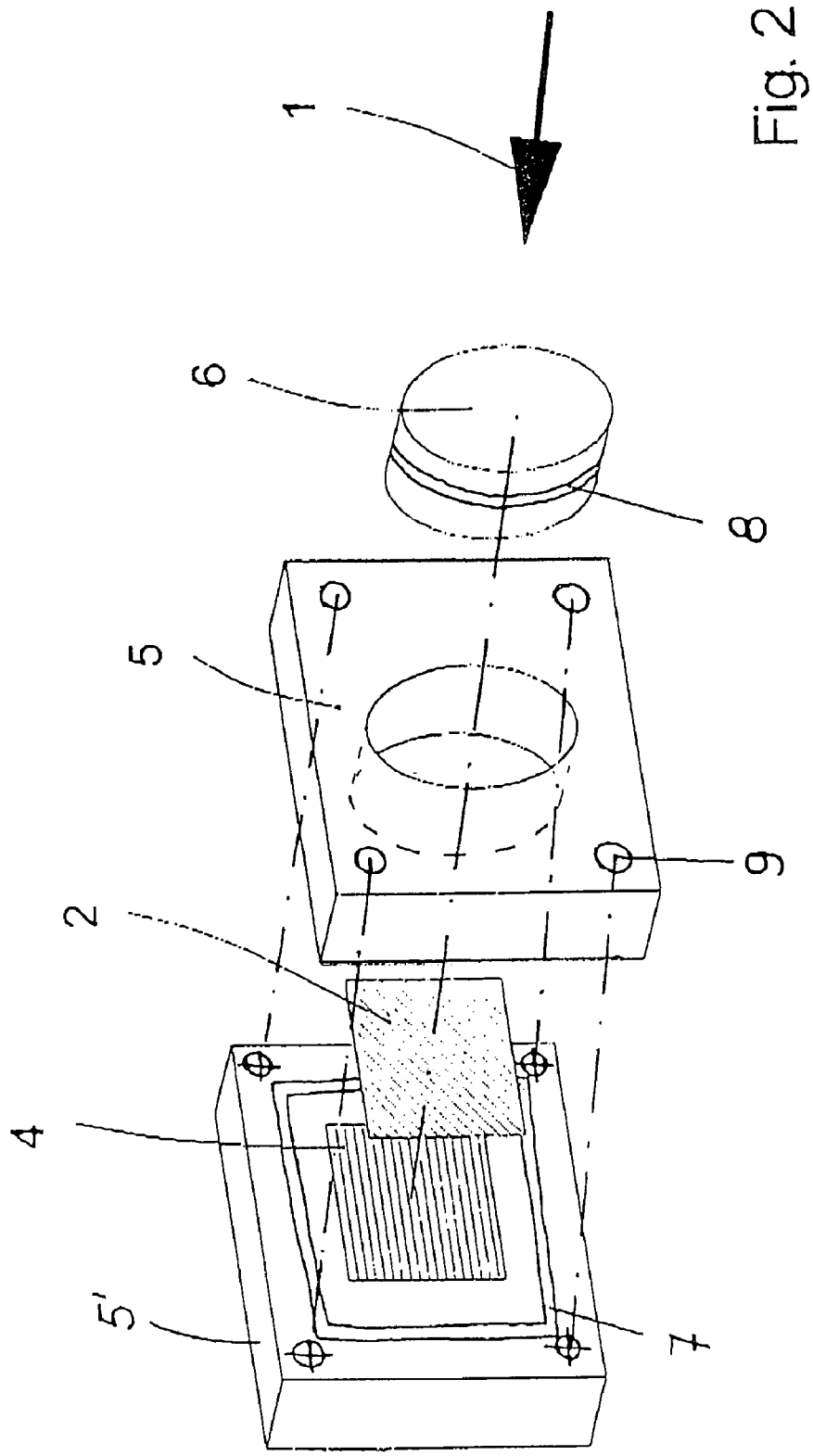

FIGS. 1 and 2 show an embodiment of the test fuel cell of the invention for characterizing and qualifying cell-internal fuel cell components.

The test fuel cell (apparatus) shown in FIGS. 1 and 2 comprises two mutually adjacent housing parts (5, 5') which accommodate two monopolar plates (2, 4) therebetween. The outer dimensions of the monopolar plates (2, 4) are less than the outer dimensions of the two housing parts (5, 5'). The object to be tested is in the form of a membrane-electrode unit 3 and is not part of the test fuel cell. The membrane-electrode unit 3 is disposed between the two monopolar plates (2, 4) and is configured larger than the monopolar plates (2, 4) as shown in FIG. 1. The membrane-electrode unit 3 is not shown in FIG. 2 for the sake of clarity. The housing parts (5, 5') have mutually adjacent sides and include respective radial sealing elements (7, 7') which seal off each housing part (5, 5') with respect to the membrane-electrode unit 3. Both housing parts (5, 5') are held together via clamping means in the form of threaded clamping bolts 9 which develop a clamping force.

The housing part or housing plate 5 has a through guide bore formed therein which is at its center. A pressure element 6 is movable in the through guide bore. The force is applied to the pressure element by a piston/cylinder unit represented schematically by arrow 1. The pressure element 6 applies a load to the monopolar plate 2 and to the inner-lying membrane-electrode unit 3. For sealing off relative to the ambient, an axial seal 8 is provided between the pressure element 6 and the guide bore of the housing part 5.

From the foregoing, it can be seen that the invention provides for a clamping of the outer housing parts (5, 5') and thereby provides a sealing with respect to the ambient as well as a separate and changeable clamping for the inner-lying membrane-electrode unit 3. The clamping of the housing parts (5, 5') for providing the sealing is assumed by the clamping bolts 9 and the clamping of the inner-lying membrane-electrode unit 3 is realized by a separate force 1 of a piston/cylinder unit which is independent of the clamping force provided by the clamping bolts. This force 1 can be varied so that the membrane-electrode unit 3 can be loaded with different forces without it being necessary to open the test fuel cell from time to time during the testing process.

It is understood that the foregoing description is that of the preferred embodiments of the invention and that various changes and modifications may be made thereto without departing from the spirit and scope of the invention as defined in the appended claims.

What is claimed is:

1. A test fuel cell for characterizing and qualifying cell-internal fuel cell components of one fuel cell, the test fuel cell comprising:

a housing having first and second housing plates for accommodating said fuel cell components of said one fuel cell therebetween;

said first and second housing plates being clamped with a force to effect a sealing therebetween;

a pressure element movable in said housing toward said fuel cell components;

force application means for applying a force to said pressure element for, in turn, applying a load to said fuel cell components which is separate from the clamping force to effect said sealing between said first and second housing plates;

wherein said cell-internal fuel cell components each have an active cell surface; and, said load is applied to said active cell surfaces of said fuel cell components;

wherein said first housing plate is a stationary monopolar plate and said second housing plate is also a monopolar plate with said active surface being clamped therebetween; and, said second monopolar plate is subject to said load applied by said pressure element.

* * * * *